STATIC SOLID STATE MODULARIZED ELECTRONIC CONTROL FOR HIGH SPEED CONVEYOR SORTING DEVICE

Filed July 5, 1968 4 Sheets-Sheet 1

Inventor:
Derwood F. Littlefield,
by Paul A. Frank
His Attorney.

Inventor:
Derwood F. Littlefield,
by Paul A. Frank
His Attorney.

Inventor:
Derwood F. Littlefield,
by Paul A. Frank
His Attorney.

Inventor:
Derwood F. Littlefield,
by Paul G. Frank
His Attorney.

United States Patent Office 3,512,637

Patented May 19, 1970

3,512,637

STATIC SOLID STATE MODULARIZED ELECTRONIC CONTROL FOR HIGH SPEED CONVEYOR SORTING DEVICE

Derwood F. Littlefield, Scotia, N.Y., assignor to General Electric Company, a corporation of New York Filed July 5, 1968, Ser. No. 742,721
Int. Cl. B07c 5/10
U.S. Cl. 209—74 16 Claims

ABSTRACT OF THE DISCLOSURE

A static electronic control for high speed conveyor sorting devices is described which utilizes conventional, commercially available solid state transistorized logic circuit modules. The static electronic control is intended primarily for use with a high speed conveyor sorting device of the type having a plurality of serially arranged diverter pins which are selectively raised and lowered between the rollers of at least two conveyor paths to selectively control which conveyor path a particular carton passing through the sorting device, is caused to follow. The control is employed in conjunction with code reader means for viewing code markings formed on cartons to be sorted by the conveyor sorting device and deriving first control signals in accordance with such code markings. Electro-optical scanning means are also employed with the control for scanning the cartons prior to entering the conveyor sorting device and deriving a plurality of timed second control signals in accordance with the dimensions, spacing and position of the cartons relative to the location of the plurality of diverter pins. The arrangement is such that there is an individual, respective timed second control signal produced and individually associated with each diverter pin so as to readily locate the position of a carton being transported through the conveyor sorting device with respect to the position of each diverter pin. The static electronic control has the input thereof coupled to the outputs from the code reader means and the electro-optical scanning means and serves to process the first and second control signals to derive output control signals for controlling the selective raising and lowering of the diverter pins individually at high speed. The static electronic control comprises a plurality of electrically operable diverter pin actuating devices, there being one actuating device for each diverter pin to be controlled. Individual diverter pin logic circuit means are coupled to and control each of the respective diverter pin actuating devices. Means are provided for coupling the first control signals from the code reader means to the input of the first diverter pin logic circuit means for controlling the operation of the first diverter pin actuating device. Means are also provided for coupling the respective, timed second control signals from each electro-optical scanning means to its respective associated individual diverter pin logic circuit means. The code reader information bearing enabling signals supplied to the first diverter pin logic circuit means is supplied sequentially to the diverter pin logic circuit means for all of the diverter pins by coupling successive diverter pin logic circuit means together starting with the first logic circuit means. In this manner, all of the diverter pin logic circuit means are conditioned in succession with the control information contained in the first control signals derived by the code reader means. Thus, if the code reader calls for the diverter pin to be raised, all of the logic circuit means will be conditioned to raise their associated diverter pin and to leave the diverter pin in the raised position for succeeding cartons until a carton comes along calling for the diverter pins to be lowered. In this manner, cycling up and down of the diverter pins is minimized and the operating life of the equipment is extended and maximized. Means are also provided for coupling carton location enabling signals between the logic circuit means of adjacent diverter pins for conditioning each successive diverter pin in accordance with the position of each carton as it is transported through the high speed conveyor device, and reset logic circuit means are coupled to all of the diverter pin logic circuit means for resetting all of the diverter pins to a known condition at the time of start-up.

This invention relates to a new and improved static, solid state semiconductor, modularized electronic control for high speed conveyor sorting devices and the like.

More particularly, the invention relates to a static electronic control which minimizes the duty cycle of the electromechanical, high speed conveyor separating apparatus with which it is intended primarily to be used so as to maximize the operating life of the overall equipment and increase its reliability. The control is designed to operate at high speeds, and is relatively simple and inexpensive to manufacture in that it employs conventional commercially available solid state transistorized logic circuit modules, and is readily maintained.

In copending United States application Ser. No. 742,806 (General Electric patent docket 14D–4084) assigned to the General Electric Company, and entitled "High Speed Conveyor Sorting Device"—James L. Chengges and Frank L. Denzler, inventors—filed concurrently with this application, a new and improved high speed conveyor sorting device is described. This new high speed conveyor sorting device is intended for use at central processing (sorting) locations in the conveyor system of an automatic warehouse for separating out (sorting) certain cartons or containers which are to be diverted to a particular warehouse storage area, distribution point, etc., from a master or mainline conveyor path and supplied to a diverted, second conveyor path. Because of its central location, the conveyor sorting device must be capable of operating at extremely high speeds in comparison to the speed of sorting obtainable with prior art sorting devices of the alligator jaw type, etc. In addition, the device must be entirely reliable in operation, possess a maximum operating life, be relatively simple and inexpensive to manufacture, and readily maintained. The present invention describes a static, electronic control utilizing modularized, solid state semiconductor logic circuit structures and which make possible the attainment of all of these desirable features. Furthermore, the static, solid state modularized electronic control made available by the invention lends itself to other practical applications wherein a series of work producing elements are to be sequentially controlled in carrying out work with respect to an object transported past the series elements, and wherein the work to be carried out is identified by code markings formed on the objects.

It is therefore a primary object of this invention to provide a new and improved static, solid state semiconductor electronic control using modularized logic circuit structures for use in controlling high speed conveyor sorting devices and the like.

Another object of the invention is the provision of a static electronic control of the above type which minimizes the duty cycle of the electromechanical, high speed conveyor sorting device diverter pins so as to extend and maximize the operating life of the equipment. The electronic control is highly reliable in operation due to its solid state character, operates at high speeds, is relatively simple and inexpensive to manufacture in that it employs standard, commercially available solid state transistorized logic circuit modules as building blocks, and is readily maintained.

In practicing the invention, a static solid state semiconductor modularized electronic control is provided for a high speed conveyor sorting device of the type having a plurality of serially arranged diverter pins which are selectively raised and lowered between the rollers of at least two conveyor paths to selectively control which conveyor path a particular carton passing through the device is caused to follow. The static electronic control is used in conjunction with code reader means for viewing code markings formed on cartons to be sorted by the conveyor sorting device, and for deriving first control signals in accordance with such markings. Electro-optical scanning means are also provided for scanning the cartons prior to entering the conveyor sorting device and for deriving a plurality of timed, second control signals in accordance with the dimensions, spacing and position of the cartons relative to the plurality of diverter pins. With this arrangement there is a respective timed, second control signal that is individually generated and associated with each diverter pin for identifying the position of a carton passing through the conveyor sorting device with respect to the location of its respective, associated diverter pin. The static electronic control has its input coupled to the outputs from the code reader means and the electro-optical scanning means and serves to process the first and second control signals to derive ouput control signals for controlling the selective raising and lowering of the diverter pins individually at high speeds. The static electronic control comprises a plurality of electrically operable diverter pin actuating devices, there being one actuating device (such as an SCR amplifier dlriving a solenoid actuated pneumatic valve assembly) for each diverter pin to be controlled. Individual diverter pin logic circuit means are coupled to and control each of the respective diverter pin control SCR amplifier output devices. Means are provided for coupling the first control signals from the output of the code reader to the input of the first diverter pin logic circuit means for controlling the operation of the first diverter pin control relay winding in accordance with the control information supplied from the code reader. Means are also provided for coupling the respective timed, second control signals from the electro-optical scanning means to their respective associated individual diverter pin logic circuit means. The code reader information bearing enabling signal supplied to the first diverter pin logic circuit means is then supplied to the diverter pin logic circuit means of each successive diverter pin sequentially to thereby condition all of the diverter pin logic circuit means in succession with the control information contained in the first control signals derived by the code reader means. The carton location enabling signal developed by each respective electro-optical scanning means is supplied not only to its respective associated individual diverter pin logic circuit means, but is also supplied to adjacent diverter pin logic circuit means for preconditioning and controlling the operation of each successive diverter pin in accordance with the position of the cartons as they are transported through the high speed conveyor sorting device. Reset logic circuit means are coupled to all of the diverter pin logic circuit means for resetting all of the diverter pins to a known condition upon start-up. If desired, manually operable relay means may be provided for actuating all of the electrically operable diverter pin control solenoid windings simultaneously.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
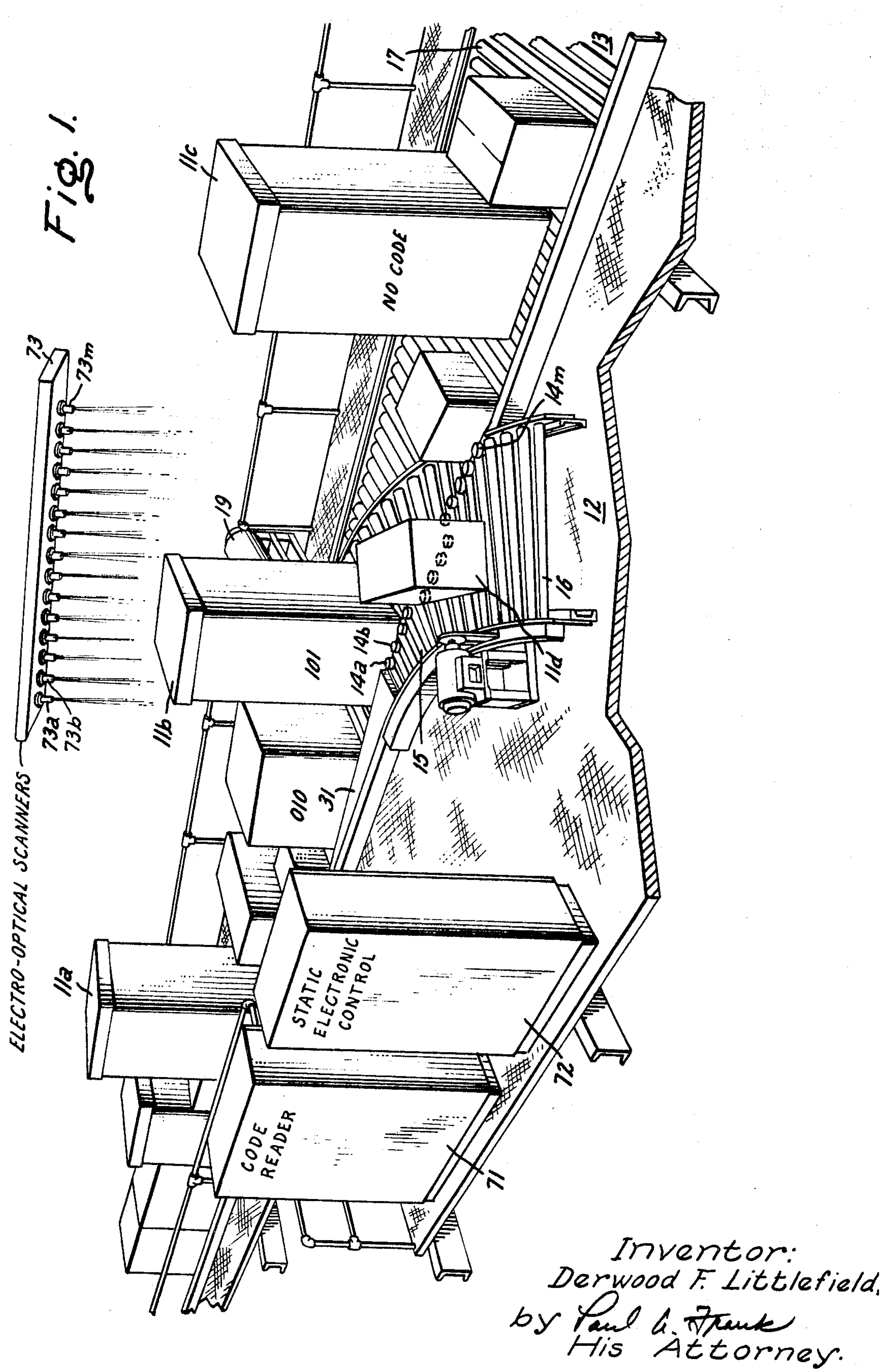
FIG. 1 is a schematic perspective view of a high speed conveyor sorting device with which the static electronic control comprising the present invention is intended primarily to be used and illustrates the relative location of the various component parts of the conveyor sorting device, and their location with respect to the static electronic control.

FIG. 1 is a schematic, perspective view of a high-speed conveyor sorting device which employs the new improved static solid state semiconductor modularized electronic control comprising the present invention. The high speed conveyor sorting device shown in FIG. 1 comprises a conveyor transfer mechanism for transferring carton objects such as those illustrated at 11*a*, 11*b*, 11*c*, and 11*d* from a first mainline conveyor path, indicated generally at 12, to a second divert conveyor path, indicated at 13. It will be appreciated therefore that during operation, the high speed conveyor sorting device causes incoming carton goods such as those shown at 11*a* and 11*b* to follow a generally curved mainline first conveyor path 12 in the manner of the carton 11*d*, or to follow a generally straight, divert second path 13 in the manner of the carton shown at 11*c*. In this manner, the multiplicity of cartons supplied to the input side of the high speed conveyor sorting device are caused to be classified into one of two different categories, and thereafter are transported to and along either one of the first or second conveyor paths 12 or 13. In order to cause the incoming cartons such as 11*a* and 11*b* to be transported along either the first conveyor path 12 or the second conveyor path 13, a plurality of diverter pins shown at 14*a* through 14*m* are disposed intermediate a plurality of first rollers 15 that comprise the first conveyor path 12. The diverter pins 14*a* through 14*m* are selectively raised and lowered by a suitable diverter pin actuating air cylinder for selectively raising and lowering the diverter pins 14*a* through 14*m*, individually. With the diverter pins 14*a* through 14*m* in the raised position, the cartons such as 11*a* and 11*b* will be caused to follow along a generally straight line path comprised by the second conveyor path 13 in the manner indicated by the carton 11*c*. With the diverter pins 14*a* through 14*m* in their lowered position, the incoming cartons 11*a* and 11*b* are caused to be transported along a generally curved path defined by the first conveyor path 12 in the manner shown by carton 11*d*. The raising and lowering of the diverter pins 14*a* through 14*m* is accomplished by individual associated air cylinders which are SCR amplifier controlled for automatic operation, or relay controlled manually. The present static electronic control is intended primarily for the selective actuation of the several solenoid windings controlling the air cylinders for selectively raising and lowering the diverter pins 14*a* through 14*m*. For a more detailed description of the conveyor sorting device and the manner in which it is operated, reference is made to the above-mentioned copending United States application Ser. No. 742,806 (General Electric patent docket 14D-4084—Chengges and Denzler).

The high speed conveyor sorting device shown in FIG. 1 further includes a commercially available sequential code reader, indicated at 71, which may comprise a conventional, commercially available photo-electric sequential code reader such as that manufactured and sold by the Specialty Control Department of the General Electric Company located at Waynesboro, Va., and identified as the Specialty Control Sequential Code Reader Model No. 35760SA102B1. This commercially available code reader reads eight (8) different combinations of a three (3) bit binary code or the absence of any code, and develops output first control signals in accordance with such code markings (or their absence). The code markings are read by a suitable photosensor that is operated by sensing the difference in light level in the presence or absence of code markings.

The high speed conveyor sorting device also further includes an array of electro-optical scanning devices shown at 73. There are in fact thirteen (13) photo-electric, coaxial scanners (one for each of the diverter pins 14*a*–14*m*) which are installed nine feet above the high speed conveyor sorting device, and are spaced apart by a distance of six inches. This distance also is the center to center spacing between the rollers 15 comprising the conveyor device. Associated retro-reflectors are located below and between the conveyor rolls for establishing a light beam path between the photo-electric scanner 73 and the retro-reflectors. As a carton passes through the high speed convyor sorting device, the carton will intercept each of the thirteen light beam paths sequentially so that, in effect, the photo-electric scanners 73 serve to establish the location of each carton with respect to each of the diverter pins 14*a*–14*m* as the carton is transported through the high speed conveyor sorting device.

The output signals from all thirteen photo-electric scanners 73 are supplied to the static electronic control (shown at 72) comprising the present invention along with the first control signals from the code reader 71 which are representative of the code markings (or the absence thereof) on each carton passing into the high speed conveyor sorting device. The static electronic control 72 then serves to process the first and second control signals supplied thereto from the code reader means 71 and the photoelectric scanning means 73, and to derive output control signals in accordance with the intelligence contained in these first and second input control signals. The output control signals are then employed to control selective raising and lowering of the diverter pins 14 in a manner to be described more fully hereinafter.

Figure 2:
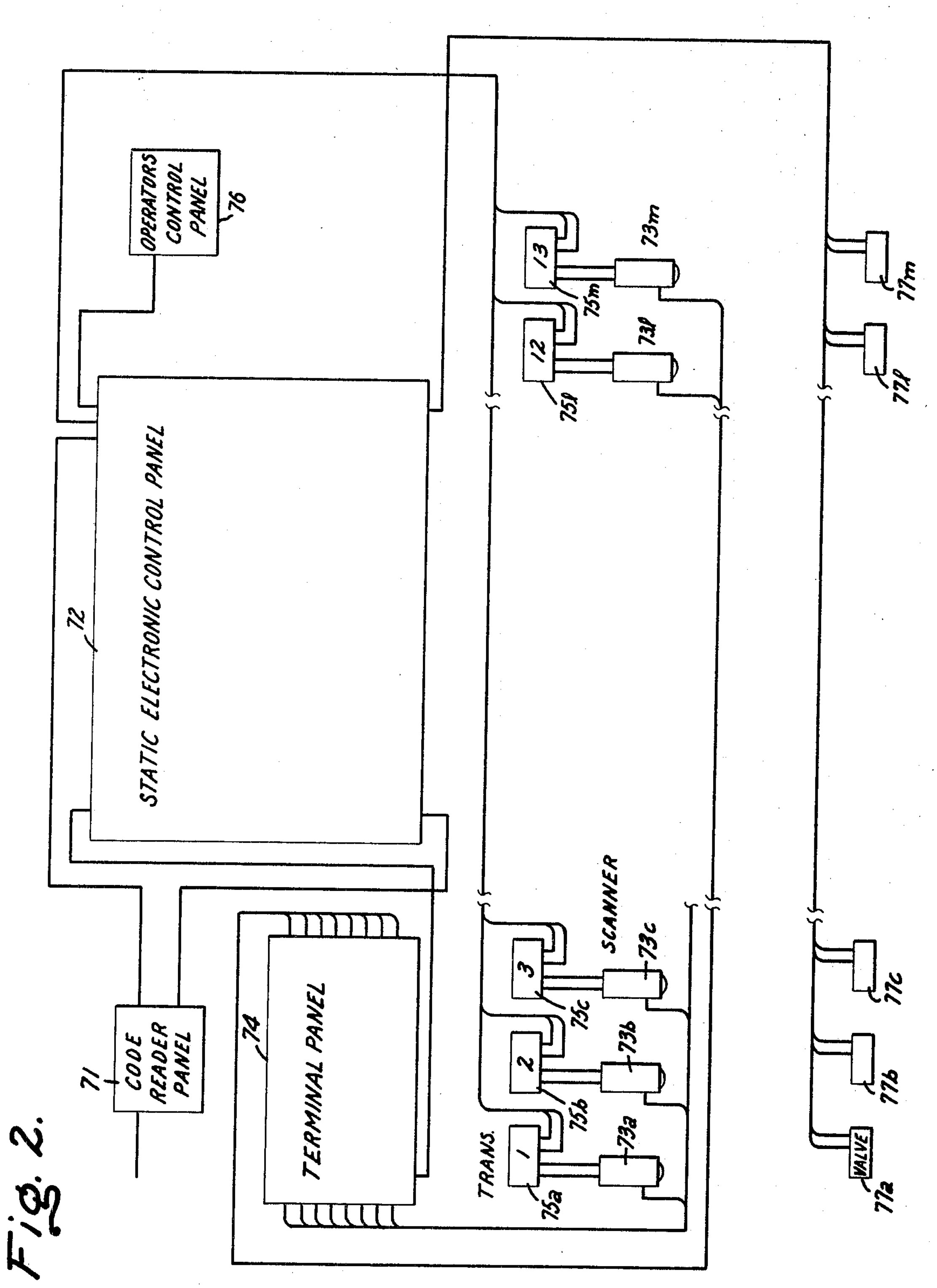
FIG. 2 is a functional block diagram of the various component parts of the overall conveyor sorting device including the static electronic control as a component part thereof, and illustrates the electrical circuit relationship of these various parts.

FIG. 2 of the drawings is a functional block diagram showing the electrical interconnections between the output of the code reader 71 and the input to the static electronic control panel 72. The inputs supplied to the static electronic control panel 72 from the several electro-optical scanners 73*a* through 73*m*, are supplied through a suitable terminal panel 74 to the signal input terminals of the static electronic control 72. Energizing power for the electro-optical scanners 73*a* through 73*m* is provided through suitable transformers 75*a* through 75*m*. The scanners 73 and their associated power supply transformers 75 may comprise conventional, commercially available, coaxial optical scanners and associated power supply light transformers such as are manufactured and sold commercially by the Specialty Control Department of the General Electric Company located in Waynesboro, Va. An operator's control panel shown at 76 is also included and is connected to the static electronic control panel 72 to provide a manual control feature comprising a part of the overall control made available by the invention. The output control signals developed by the static electronic control 72 are then supplied to the individual solenoid windings shown at 77*a* through 77*m* which in turn control actuation of the air cylinders that raise and lower the individual diverter pins 14*a* through 14*m* shown in FIG. 1.

Figure 3:
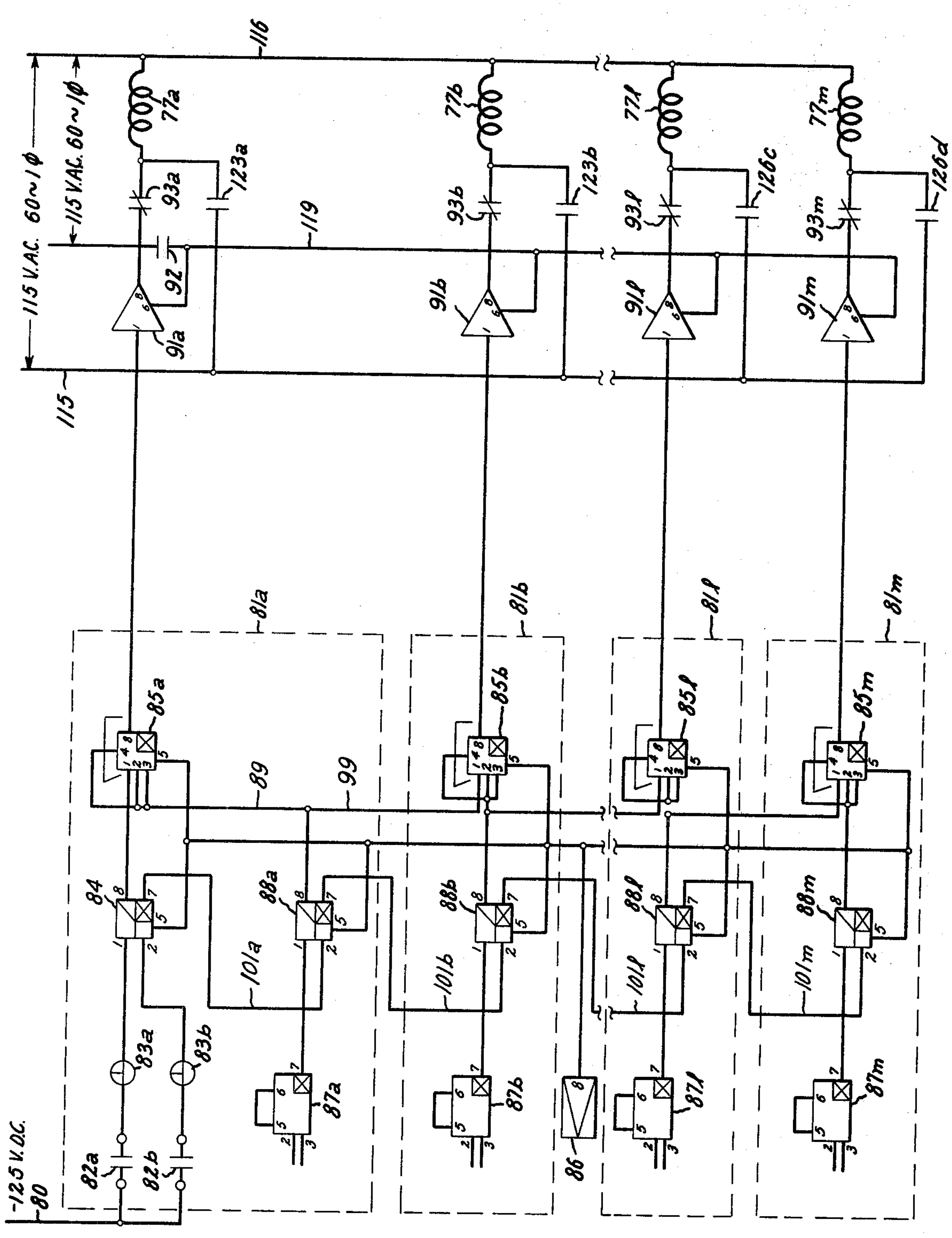
FIG. 3 is a detailed logical circuit diagram of the logic circuit means comprising a part of the solid state semiconductor modularized electronic control comprising the present invention.

FIG. 3 is a logical circuit diagram showing the details of construction of the static, solid state semiconductor, modularized electronic control 72. In the embodiment of the invention shown in FIG. 3, the static electronic control is comprised by a plurality of electrically operable diverter pin actuating devices 77*a* through 77*m* which in fact constitute the solenoid actuating windings of pneumatic valves controlling the air cylinders that comprise electro-mechanical coupling arrangements for raising and lowering the individual diverter pins 14*a* through 14*m*. It is believed apparent that the solenoid winding 77*a* will control raising and lowering of the diverter pin 14*a*, 77*b* controls diverter pin 14*b*, and so on.

Each of the diverter pin solenoid windings, such as 77*a*, is controlled by its own individual diverter pin logic circuit means 81*a* through 81*m*. The first diverter pin logic circuit means 81*a* is somewhat different from the remaining logic circuit means 81*b* through 81*m* in that it is designed to receive the code reader information inputs from the code reader 71 in addition to object location information supplied from its associated electro-optical scanner. For this purpose, the first diverter pin logic circuit 81*a* includes a means comprised by a pair of relay contacts 82*a* and 82*b* for coupling the first control signals supplied from the output of the code reader to the input of the first diverter pin logic circuit 81*a*. The contacts 82*a* and 82*b* in fact constitute the relay contacts of a pair of solenoid actuated relays whose actuating windings are selectively excited by the code reader 71. The relay contacts 82*a* constitute the divert signal input to the first logic circuit means 81*a* and are closed by the occurrence of a carton, such as 11*c* shown in FIG. 1, which is uncoded, or coded for divert path treatment. Closure of the relay contacts 82*a* in conjunction with coaxial scanner inputs will result in raising all of the diverter pins for a particular carton in question so that it is caused to follow the straight through, divert path 13 shown in FIG. 1. The relay contacts 82*b* will be closed by an appropriate output signal from the code reader 71 upon the occurrence of a carton such as 11*d* which is appropriately coded for passage along the curved main line conveyor path 12. Closure of the contacts 82*b* in conjunction with coaxial scanner inputs will result in causing all of the diverter pins 14*a* through 14*m* to be lowered (as will be described more fully hereinafter) so that the particular carton in question will be transported through the conveyor sorting device along the curved main line path 12. With respect to the following discussion, it should be noted that it is immaterial which set of relay contacts 82*a* or 82*b* causes the diverter pins to be raised or lowered since this is merely a matter of appropriate connection of the output signals of the code reader to the excitation winding of a particular set of relay contacts. For convenience of illustration, the following convention has been established whereby closure of the relay contacts 82*a* is considered to result in raising of the diverter pin, and hence by convention is defined as diverting cartons from the curved main line path 12 to the straight line divert path 13.

Closure of the relay contacts 82*a* results in applying a minus 125 volt direct current potential from a direct current supply line terminal 80 to a power input terminal of a solid state semiconductor, modularized original input voltage conversion circuit means 83*a* for converting the high potential (minus 125 volt direct current) excitation voltage to a low potential logic signal level. The 125 volt DC original input 83*a* is a solid state semiconductor, modularized pilot device for supplying information into the control logic circuit means at a logic level ON or OFF signals of the proper magnitude. Since the relay contacts 82*a* are normally operated at minus 125 volt DC derived from a logic circuit power supply such as that shown in FIG. 4, it is necessary to convert this high potential voltage to a lower logic signal level ON or OFF signal. In this regard, it should be noted that in the static control system described hereinafter, a signal of zero volts DC is considered to be an ON signal and a signal of minus 4 volts DC is an OFF signal. Whenever it is stated that "there is an input" or "an output exists," this statement means that a zero volt ON signal is present at the respective terminal point in question. From this comment, it will be appreciated therefore that the 125 volt DC original input module 83*a* functions to convert the high potential minus 125 volt DC to the lower potential logic signal level. With the output terminal of the voltage conversion device 83 connected to the input of a logic element, a minus 4 volt OFF signal normally will be present when the unit is not in the ON condition. The unit is placed in the ON condition by the closure of the relay contacts 82*a*. Hence, it will be appreciated that upon closure of the relay contacts 82*a*, the output from the original input voltage conversion device 83*a* will go from a minus 4 volt OFF signal to a 0-volt ON signal.

The minus 125 volt DC original input voltage conversion device 83*a* is a conventional, commercially available solid state semiconductor, modularized circuit structure which is manufactured and sold commercially by the General Purpose Control Department of the General Electric Company located in Bloomington, Ill. This statement is also true of the additional logic circuit structures used in the static electronic control and to be described hereinafter such as the off-return memory logic means shown at 84 which has its number one input terminal connected to the output of the device 83, and sealed AND logic means 85 having its number 1 input terminal connected to the number 8 output terminal of off-return memory logic element 84, and a reset logic circuit means shown at 86. All of these logic circuit elements comprise modularized, solid state semiconductor circuit structures which are described more fully in a publication GPC–B53D entitled, "Transistorized Static Control" published by the General Purpose Control Department of the General Electric Company. From this note, it will be appreciated therefore that the logic circuit structures referred to hereinafter are commercially available items which can be obtained from the General Purpose Control Department in much the same manner as conventional vacuum tubes, transistors, or other electronic circuit components.

The output ON signal derived from the output of original input voltage conversion device 83*a* is supplied to the number 1 input terminal of a solid state semiconductor, modularized off-return memory logic means 84. The off-return memory logic means 84 comprises a set of interconnected AND-NOT circuit structures connected in a manner such that an ON signal supplied to its number 1 input terminal produces an ON output signal at its number 8 output terminal. The application of an ON input signal to its number 2 input terminal produces an ON output at the number 7 output terminal. The application of a reset pulse to the number 5 reset input terminal results in resetting the circuit so that an OFF output is produced at output terminal 8.

The ON output signal appearing at the number 8 output terminal of off-return memory unit 84 is supplied to the number 1 input terminal of a sealed AND logic means 85 which like the off-return memory unit module is a standard, commercially available modularized logic unit that can be purchased from the General Purpose Control Department of the General Electric Company. The characteristics of the sealed AND logic means 85 are such that with ON input signals at all three of its number 1, number 2, and number 3 input terminals, the module will be switched to produce an ON output signal at its number 8 output terminal, and this ON output signal will be sealed in or maintained ON until such time that OFF signals are supplied to one of the two input terminals number 2 and number 3. It will be appreciated therefore that upon closure of the relay contact 82*a*, an enabling ON signal of 0 volts is applied to the number 1 input terminal of off-return memory unit 84 and results in the production of an ON output signal that then is applied to the number 1 input terminal of the sealed AND unit 85, thereby preconditioning this unit for turn-on of the number 8 output terminal.

As a carton proceeds through the conveyor sorting device, the number 1 photo-electric scanner 14*a* detects that the reflected light from its retroreflector located underneath the conveyor roll has been interrupted by the leading edge of the carton. This will result in the production of an enabling signal from the photo-electric scanner 14*a* that is applied to the input terminals 2 and 3 of a photo-electric module 87*a*. The photo-electric module 87*a* is a solid state semiconductor, modularized logic circuit structure that is manufactured and sold commercially by the Specialty Control Department of the General Electric Company located in Waynesboro, Va., and is intended for use with the photo-electric scanner also marketed by that department. Since the photo-electric module 87*a* is a commercially available item and has been described in a number of publications, a further description of this element is believed unnecessary. The photo-electric module 87*a* possesses operating characteristics such that the application of an enabling potential at the number 2 and 3 input terminals results in the production of an ON output signal at its number 7 output terminal.

From the foregoing description, it will be appreciated that as a carton proceeds into the conveyor sorter, and the leading edge interrupts the reflected light beam to the photo-electric scanner, the photo-electric module 87*a* produces an ON output signal at its number 7 output terminal which is applied to the number 1 input terminal of a second off-return memory module unit 88*a*. This results in producing an ON output signal at the number 8 output terminal of off-return memory module unit 88*a* which is supplied over a conductor 89 to the number 2 and number 3 input terminals of the sealed AND unit 85*a*. All three input terminals, number 1, number 2, and number 3 of sealed AND unit 85*a* are now enabled with ON signals, so that this unit produces an ON output signal at its number 8 output terminal.

The number 8 output terminal from the sealed AND unit 85*a* is connected to the number 1 input terminal of a solid state semiconductor, modularized AC output amplifier 91*a*. The AC output amplifier 91*a* similarly comprises a standard, commercially available item manufactured and sold by the General Purpose Control Department of the General Electric Company and is described in greater detail in the above-referenced publication GPC–B53D entitled "Transistorized Static Control." The AC output amplifier has a number 6 power input terminal connected to a source of 115 volt, 60 cycle, single phase alternating current through the relay contacts 92 of a master control relay which controls the supply of alternating current power through a supply line terminal 119 to all of the AC output amplifiers for all of the diverter pins actuating relay windings 77*a* through 77*m*. The number 8 power output terminal of the AC output amplifier 91*a* is connected through the normally closed contacts 93*a* of a manually operated relay (to be described hereinafter) to one side of the diverter pin actuating relay winding 77*a* with the remaining side of winding 77*a* being connected to a second supply line terminal 116 of the 115 volt AC source. From this description, it will be appreciated that the provision of an ON input signal to the number 1 input terminal of the AC output amplifier 91*a* results in turning this amplifier on so as to supply a 115 volt alternating current enabling potential to the actuating windings 77*a* of the first diverter pin solenoid 14*a*. This will result in raising the first diverter pin 14*a* between the rollers of the conveyor sorting device so as to cause a diverting effect on the carton passing through the device in the manner described more fully in the above-referenced copending application of Chengges and Denzler.

The ON output signal from the number 8 output terminal of second off-return memory module 88*a* is also supplied through a conductor 99 to the number 1 input terminal of the sealed AND logic module 85*b* in the next diverter pin logic circuit means 81_b_ controlling energization of the relay winding 77_b_ for the next or second diverter pin 14_b_. This in effect causes a transfer of the code reader information enabling signal from the number 1 diverter pin logic circuit means 81_a_ to the next successive diverter pin logic circuit means 81_b_ thereby preconditioning the logic circuit means 81_b_ for sequential operation in the same manner of the logic circuit means 81_a_.

As the first carton in question proceeds through the conveyor sorting device, it will eventually interrupt the reflected light beam of the number 2 photo-electric scanner 14_b_. Upon the light beam of the number 2 photo-electric scanner 14_b_ being interrupted, an input signal is supplied to the number 2 and number 3 input terminals of the photo-electric module 87_b_ connected in the second diverter pin logic circuit means 81_b_. This results in producing an ON output signal at the number 7 output terminal of the photo-electric module unit 87_b_ which is supplied to the number 1 input terminal of the off-return memory module unit 88_b_. The ON signal applied to the number 1 input terminal of off-return memory module unit 88_b_ produces an ON output signal at its number 8 output terminal which then is supplied to the number 2 and 3 input terminals of the sealed AND module 85_b_. It will be remembered that the number 1 input terminal of sealed AND unit 85_b_ already has been enabled by the ON input signal supplied over conductor 99 from the number 1 logic circuit means 81_a_ so that sealed AND unit 85_b_ produces an ON output signal at its number 8 output terminal. The ON output signal at the number 8 output terminal then enables the AC output amplifier 91_b_ for the second diverter pin 14_b_ to energize the solenoid winding 77_b_ causing the second diverter pin 14_b_ to be raised.

From the preceding discussion it will be appreciated that at this point two (2) of the thirteen (13) diverter pins 14_a_ and 14_b_ have been placed in the raised position. As the first carton in question proceeds through the conveyor sorting device, the diverter pins will rise as fast as the carbon interrupts the photo-electric scanner associated with each diverter pin for the diverter pin that is immediately ahead of the particular photo-electric scanner in question. The ON enabling signal for each diverter pin logic circuit means such as 81_a_, is shifted to the next successive diverter pin logic circuit means as described above for logic circuit means 81_b_ until all thirteen (13) diverter pins have been actuated by the carton in question as it proceeds through the conveyor sorting device. It should be remembered at this point that this particular first carton was assumed to be marked with a "divert" code or to have no code markings at all.

As the trailing edge of the first carton described above proceeds out of the reflected light beam of the number 1 electro-optical scanner, the ON signal supplied to input terminals numbers 2 and 3 of the first photo-electric module unit 87_a_ will change voltage level, and result in the production of an OFF output signal at its number 7 output terminal. This OFF signal is supplied to the number 1 input terminal of off-return memory module unit 88_a_. Output terminal 8 of off-return memory module unit 88_a_ continues to supply an ON output signal, however, due to the fact that the unit operates as a memory. As a consequence, ON enabling signals will still be supplied to the number 2 and number 3 input terminals of the sealed AND unit 85_a_. Since the input terminal 1 still has an enabling ON signal applied to it from the off-return memory unit 84 for the same reason (i.e. unit 84 is a memory), and by the fact input terminal number 1 is sealed due to the characteristic of the sealed AND unit (i.e., pin number 4 is connected to pin number 2), the sealed AND unit 85_a_ maintains an ON output signal which will continue to enable the AC output amplifier 91_a_ to keep the solenoid winding 77_a_ energized. As a consequence, the circuit does not change state so that the number 1 diverter pin 14_a_ is maintained in the raised position. This same condition will apply to all of the remaining thirteen (13) diverter pins 14_b_ through 14_m_.

Accordingly, if a carton with a "divert" code or with no code markings at all immediately follows the first carton (which was assumed to have no code markings) all of the diverter pins 14_a_ through 14_m_ will be maintained in the previously established condition, that is, in the particular example described, with all diverter pins in the raised position. It will be appreciated, therefore, that by reason of this arrangement, cycling up and down of the individual diverter pins for each and every carton passing through the conveyor sorting device is avoided. The diverter pins are caused to raise or lower only in the event that the coding on a carton (or the absence of coding) calls for a different position of the diverter pins than that previously established by an immediately preceding carton. Upon the occurrence of a carton entering the high speed conveyor sorting device which is coded in a manner to indicate that it should not be diverted but should be allowed to follow the curved mainline conveyor path 12, the sequential code reader 71 will supply an output energizing signal to the relay winding that closes the coded-not divert contacts 82_b_ shown in FIG. 3. This results in the energization of the original input voltage conversion device 83_b_ and produces an ON output signal that is supplied to the number 2 input terminal of the off-return memory module unit 84 in the first logic circuit means 81_a_. Since under the assumed conditions there will be an absence of a signal on the number 1 input terminal, the off-return memory module 84 changes state so as to produce an ON output signal at its number 7 output terminal and an OFF output signal at its number 8 output terminal. As a consequence, an OFF output signal will be supplied to the number 1 input terminal of the sealed AND module 85_a_. However, this is not sufficient to switch sealed AND module 85_a_ due to the fact that input terminal 1 is sealed ON by internal circuitry and ON inputs are still applied to input terminals 2 and 3, so that it continues to produce an ON output signal at the number 8 output terminal. However, it does precondition the sealed AND module 85_a_ by supplying to its number 1 input terminal the OFF signal appearing at the number 8 output of off-return memory 84.

The ON signal appearing at the number 7 output terminal of off-return memory 84 is supplied over a conductor 101 to the number 2 input terminal of off-return memory unit 88_a_. Application of an ON signal to the number 2 input terminal of 88_a_ will cause this off-return memory unit to change state provided that there is no ON signal also being applied to the number 1 input terminal thereof. If it is assumed that all of the prior mentioned cartons no longer interrupt the reflected light beam of the number 1 photo-electric scanner, then the number 1 input terminal of module 88_a_ will be OFF, and the ON signal applied to the number 2 input terminal causes off-return memory unit 88_a_ to switch condition to produce an OFF output signal at its number 8 output terminal. The OFF output signal from 88_a_ is supplied over conductor 89 to the numbers 2 and 3 input terminals of sealed AND unit 85_a_ which previously has been preconditioned by the application of an OFF signal to its number 1 input terminal from off-return memory unit 84. Accordingly, sealed AND unit 85_a_ will be switched to its OFF condition whereby an OFF output signal is produced at its number 8 output terminal. This results in turning off the AC output amplifier 91_a_ and de-energizing the solenoid winding 77_a_. As a consequence, a biasing spring in the air cylinder driving the diverter pin 14_a_ will cause pressure to be supplied to a side of an air piston within the cylinder which moves the diverter pin 14_a_ to its lower or down position as described more fully in the above-referenced Chengges and Denzler application.

The OFF signal appearing at the number 8 output terminal of off-return memory 88_a_ is also supplied over conductor 99 to the number 1 input terminal of sealed AND unit 85_b_ of the second logic circuit means 81_b_ for the second diverter pin 14_b_. Consequently, it will be appreciated that as the trailing edge of the first mentioned carton passes out of the light beam of the second photo-eletcric scanner, the photo-electric module 87b will sense a change in light level and cause its associated off-return memory 88b to produce an OFF output signal that is applied to the numbers 2 and 3 input terminals of the sealed AND module 85b. This causes sealed AND module 85b to change state thereby turning off the AC output amplifier 91b and de-energizing the solenoid winding 77b for the second diverter pin 14b. Consequently, the second diverter pin 14b likewise will be retracted to its down position.

As the second carton marked with the non-divert code markings continues to proceed through the conveyor sorting device, the diverter pin solenoid windings 77c through 77m for all of the diverter pins 14c through 14m will de-energize in a similar fashion due to the fact that the static logic circuit means 81c through 81m will shift information to the next successive circuit as the photo-electric scanner light beam paths are re-established by passage of the trailing edge of the last of the first-mentioned cartons. It follows, therefore, that each logic circuit means 81c through 81m will be switched from its ON condition to an OFF condition whereby all of the remaining diverter pins 14c through 14m will be retracted to their down position. The diverter pins will then remain in this position until a carton passing through the conveyor sorting device calls for a raised "divert" position for the diverter pins in which event the above-described cycle will be repeated. It should be noted, however, that once the diverter pins 14a throuh 14m have been positioned in either a raised position or a lowered position, they will remain in that position until a different position is called for by one of the cartons being processed. While only two stages of the thirteen stage control circuits have been discussed in detail, it is believed apparent that the remaining stages operate in exactly the same manner as the first two, and hence a detailed description of the manner of operation of the remaining stages is not required.

In order to insure proper operation and sequencing of all of the logic circuits means 81a through 81m, a reset logic module 86 is connected through conductor 102 to the number 5 reset input terminals of all of the off-return memory module units 84 and 88a through 88m, and is connected to the number 5 reset input terminals of all of the sealed AND modules 85a through 85m. By reason of this arrangement, upon application of main control power to the static control circuit, all of the logical circuit means 81a through 81m can be switched to a known OFF-start operation condition. It should also be noted that, if desired, the circuit could be readily modified to return all the diverter pins to a previously established condition following power interruption, or the like.

Figure 4:
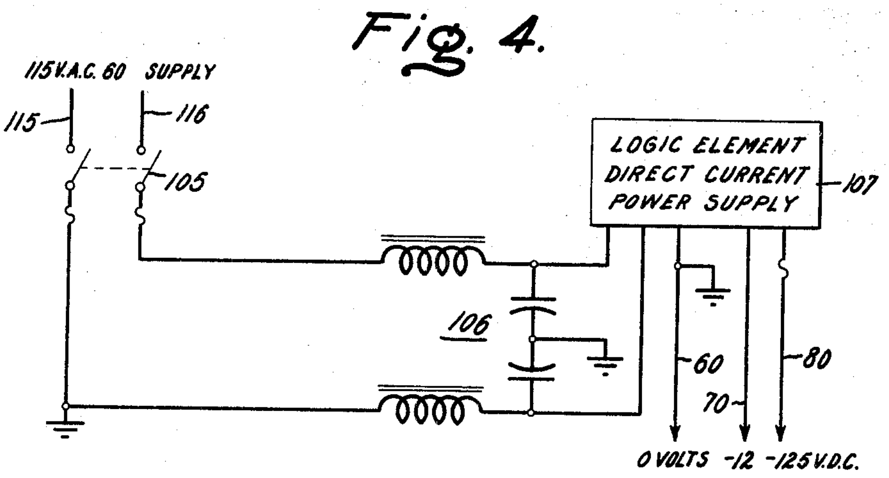
FIG. 4 is a schematic circuit diagram of the logic circuit power supply system used in connection with the invention.

FIG. 4 of the drawings is a schematic circuit diagram of a suitable logic element direct current power supply for use with the static electronic control shown in FIG. 3. Referring to FIG. 4, a master ON-OFF switch 105 supplies 115 volt, 60 cycle single phase alternating current through a suitable filter circuit 106 to the logic element direct current power supply shown at 107. The power supply 107 may comprise any suitable regulated rectifier power supply for rectifying the alternating current and deriving at supply line terminals 60, 70, and 80 output voltages representative of 0 volts, −12 volts and −125 volts direct current, respectively. Connections of the 0-volt and −12 volt supply terminals 60 and 70 to the individual logic elements employed in the static control have not been illustrated in order to simplify the drawings and also due to the fact that the provisions of such connections is believed to be entirely within the ability of one skilled in the art.

Figure 5:
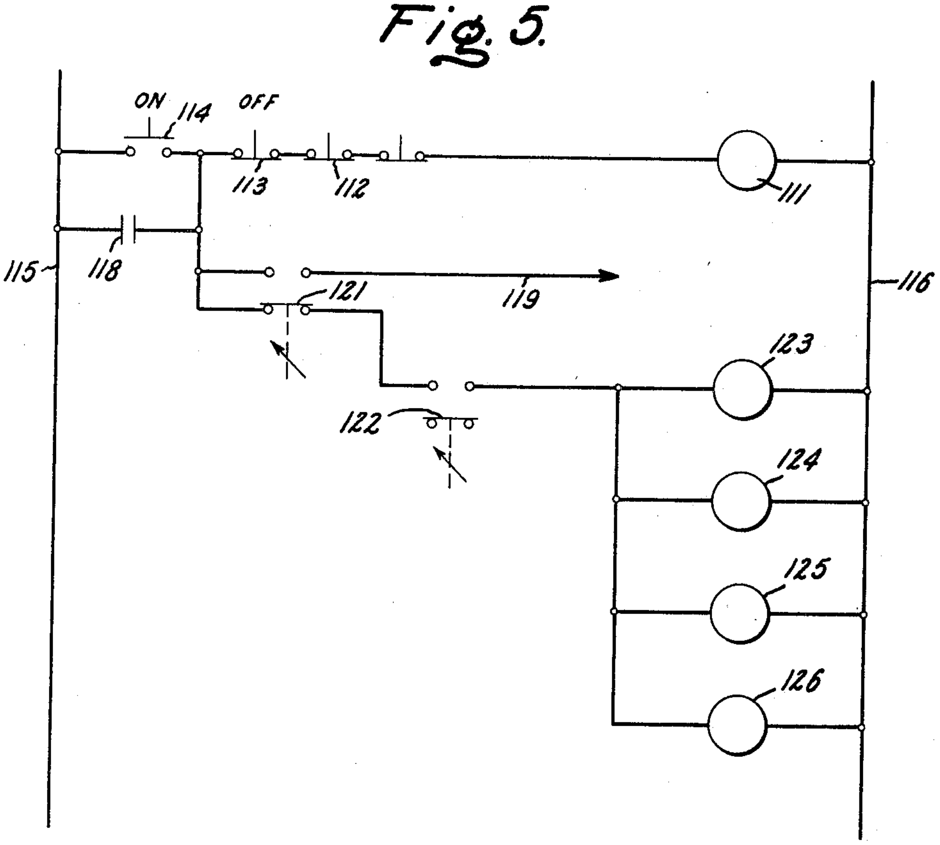
FIG. 5 is a circuit diagram of a manually operable control feature included in the novel static electronic control comprising the invention.

FIG. 5 of the drawings is a schematic circuit diagram of the power supply circuit connections for the master holding relay used to energize the static electronic control, and for energizing a manually operable relay control also comprising a part of the overall static control. The energizing circuit is comprised by a first master holding relay 111 which is connected in series with a plurality of emergency stop switches 112, a master OFF switch 113 and a master ON switch 114. The series circuit thus comprised is connected between the power supply terminals 115 and 116 of the alternating current power supply for the system. Upon the ON switch 114 being depressed, the master holding relay 111 will close a set of holding contacts 118 and maintain the circuit energized. Master holding relay 111 will also close the set of master contacts 92 shown in FIG. 3 controlling the supply of alternating current to the several diverter pins actuating windings 77a through 77m by means of the AC output amplifiers 91a through 91m.

A cycling switch as shown at 121 in FIG. 5 in its upper position will supply alternating current power to the correspondingly marked supply line terminal 119 shown in FIG. 3 of the drawings. With the cycle switch 121 in its upper position, the diverter pin actuating windings 77a through 77m will be operated automatically in the previously described fashion. With the cycling switch 121 in its lower depressed position shown in FIG. 5, the control will be shifted from automatic to manual operation.

With the cycle switch 121 in the lower manual position, 115 volt, 60 cycle, single phase alternating current voltage will be applied to the diverter manual down-up switch shown at 122. The manual down-up switch 122 in the up position energizes the control relays 123–126. Each of the manual control relays 123–126 has a set of four normally closed contacts and four normally open contacts, certain ones of which, such as those shown as 123a and 123b, 126c and 126d in FIG. 3, serve to connect the actuating windings 77a through 77m across the power supply terminals 115 and 116. As shown in FIG. 3, the normally closed contacts such as 93a through 93m of the relays 123 through 126 are connected between output terminal number 8 of the AC output amplifiers 91a through 91m and the diverter pin actuating windings 77a through 77m. Accordingly, with the cycle switch 121 in the down manual position, and the manual control switch 122 in the up position, all thirteen diverter pin actuating solenoid windings 77a through 77m will be directly connected across the alternating current power supply terminals 115 and 116. This will result in actuating all of the solenoid windings simultaneously and cause all of the diverter pins 14a through 14m to be raised to their upper position simultaneously. With the diverter manual switch 122 in the down position, all of the relays will be de-energized, therefore all of the diverter pin actuating solenoid windings 77a through 77m will be de-energized, and the diverter pins 14a through 14m will be returned to their down position.

From the foregoing description, it will be appreciated that the invention provides a new and improved static, solid state, semiconductor electronic control that uses modularized logic circuit structures which are standard commercial items, and which are interconnected in such a manner that they control high speed conveyor sorting diverter pins to cause the pins to be selectively raised and lowered. In the raised position, the pins are caused to do work by diverting cartons traveling along the rolls of a conveyor into a second diverted conveyor path. Hence, the diverter pin controlled by the static electronic control can be said to constitute work producing elements that are sequentially controlled. The diverter pins are caused to be cycled up and down only in the event that coded information supplied to the control calls for a position which is different from that in which the pins presently are arranged, thereby minimizing the duty cycle on the electromechanical diverter pin raising mechanisms actuated by the static electronic control. In this manner, the life of the equipment is extended and maximized, and its reliability in operation greatly improved. Further, due to the solid state character of the static electronic control and the fact that the several diverter pin channels are parallel connected, the overall system can continue to operate even in the event of a breakdown of certain of the channels, and the overall reliability of the control is very high. Further, the control is relatively simple and inexpensive to manufacture in that it employs standard, commercially available, solid state, transistorized logic circuit modules as building blocks, and further can be readily maintained.

Having described one embodiment of a new and improved static solid state semiconductor modularized electronic control for high speed conveyor sorting devices constructed in accordance with the invention, it is believed obvious that other modifications and variations of the invention are possible in the light of the above teachings. It is, therefore, to be understood that changes may be made in the particular embodiment of the invention described which are within the full intended scope of the invention as defined by the appended claims.

What I claim as new and desire to secure by Letters Patent of the United States is:

1. A static electronic control for a high speed conveyor sorting device of the type having a plurality of serially arranged diverter pins which are selectively raised and lowered between the rollers of at least two conveyor paths to selectively control which conveyor path a particular carton passing through the device is caused to follow and further including code reader means for viewing code markings formed on cartons to be sorted by the conveyor sorting device and deriving first control signals in accordance with such code markings, and electro-optical scannings means for scanning the cartons prior to entering the conveyor sorting device and deriving a plurality of timed second control signals in accordance with the dimensions, spacing and position of the cartons relative to the plurality of diverter pins, there being a respective timed second control signal individually associated with each diverter pin, the static electronic control having the input thereof coupled to the outputs from the code reader means and the electro-optical scanning means and serving to process the first and second control signals to derive output control signals for controlling the selective raising and lowering of the diverter pins individually at high speed, said static electronic control comprising a plurality of electrically operable diverter pin actuating devices, there being one actuating device for each diverter pin to be controlled, individual diverter pin logic circuit means coupled to and controlling each of the respective diverter pin actuating devices, means for coupling the first control signals from the code reader means to the input of the first diverter pin logic circuit means for controlling operation of the first diverter pin actuating device, means for coupling the respective timed second control signals from the electro-optical scanning means to their respective associated individual diverter pin logic circuit means, means for coupling code reader information bearing enabling signals between each diverter pin logic circuit means and the diverter pin logic circuit means of the next successive diverter pin to thereby condition all of the diverter pin logic circuit means in succession with the control information contained in the first control signals derived by the code reader means, means for coupling carton location enabling signals between the logic circuit means of adjacent diverter pins for controlling each successive diverter pin in accordance with the position of the cartons being transported through the high speed conveyor device, and reset logic circuit means coupled to all of the diverter pin logic circuit means for resetting all of the diverter pins to a known condition at the start of a power-on condition of the static electronic control.

2. A static electronic control according to claim 1 wherein the electrically operable diverter pin actuating devices comprise the solenoid actuating windings of an electro-mechanical coupling assembly controlling the operation of the diverter pins.

3. A static electronic control according to claim 1 further including manually operable relay means having contacts connected in all of the diverter pin logic circuit means for actuating all of the electrically operable diverter pin actuating devices simultaneously.

4. A static electronic control according to claim 1 wherein each of said diverter pin logic circuit means comprises a solid state semiconductor modularized memory logic means for producing an output ON signal at a first output terminal and an OFF signal at a second output terminal in response to a pulsed ON signal applied to a first input terminal and for retaining the OFF signal at the first output terminal until an ON input signal is applied to a second input terminal and the ON signal to the first terminal is removed, whereupon the memory logic means switches to produce an OFF signal at its first output terminal and an ON signal at its second output terminal, a solid state semiconductor modularized sealed AND logic means having a plurality of input terminals and an output terminal with feedback connections to seal in an output condition until the sealed AND logic means is switched by the presence or absence of an input signal at one of the input terminals, the output from the first output terminal of the memory logic means being applied to one input terminal of the sealed AND logic means and the output from the sealed AND logic means being connected to operate the electrically operable diverter pin actuating device, the carton location enabling signal from the next adjacent diverter pin logic circuit means being supplied to the remaining input terminals of the sealed AND logic means, and the reset signal from the reset logic circuit means being applied to reset input terminals on both the memory logic means and the sealed AND logic means.

5. A static electronic control according to claim 4 wherein the code reader means has a first divert output comprised by a first set of relay operated contacts for connecting a source of electric potential to the first input terminal of the memory logic means controlling the first diverter pin and a second not divert output comprised by a second set of relay operated contacts for connecting a source of electric potential to the second input terminal of the first diverter pin memory logic means.

6. A static electronic control according to claim 5 wherein the source of electric potential connected to the first and second inputs of the memory logic means each comprise solid state semiconductor modularized original input voltage conversion circuit means for converting a high potential excitation voltage to a low potential logic signal level, the outputs of the original input voltage conversion circuit means being connected to the respective first and second input terminals of the memory logic means and the inputs of the original input voltage conversion circuit means being connected through the respective first and second sets of code reader relay operated contacts to a source of high potential excitation voltage.

7. A static electronic control according to claim 5 wherein the second output terminal of the memory logic means of each diverter pin logic circuit means is connected to the second input terminal of the memory logic means of the next successive diverter pin logic circuit means and serves to supply all of the diverter pin logic circuit means in succession with the control information contained in the input control signals supplied by the code reader to the input terminals of the memory logic means in the first diverter pin logic circuit means.

8. A static electronic control according to claim 6 wherein the second output terminal of the memory logic means of each diverter pin logic circuit means is connected to the second input terminal of the memory logic means of the next successive diverter pin logic circuit means and serves to supply all of the diverter pin logic circuit means in succession with the control information contained in the input control signals supplied by the code reader to the input terminals of the memory logic means in the first diverter pin logic circuit means.

9. A static electronic control according to claim 8 wherein the electrically operable diverter pin actuating devices comprise the actuating windings of an electromechanical coupling assembly for controlling the operation of the diverter pins, and further including manually operable relay means for simultaneously actuating all of the diverter pin solenoid actuating windings.

10. A static electronic control according to claim 9 further including an output power amplifier connected to the output of each diverter pin logic circuit means and having the output power terminals connected to excite a respective diverter pin solenoid actuating winding and having a signal level input terminal connected to and controlled by the output from the sealed AND logic means of the respective diverter pin logic circuit means.

11. In a static electronic control for a high speed sequentially actuated device of the type having a plurality of serially arranged work producing elements which are individually selectively movable in at least two different directions to perform work in connection with objects moved through the device, and including code reader means for viewing code markings formed on the objects to be worked on by the sequentially actuated device and deriving first control signals in accordance with such code markings, and scanning means for scanning the objects prior to the objects being moved past the serially arranged work producing elements of the device and deriving a plurality of timed second control signals in accordance with the dimensions, spacing and position of the objects relative to the plurality of work producing elements there being a respective timed second control signal individually associated with each work producing element, the electronic control having the input thereof coupled to the outputs from the code reader means and the scanning means and serving to process the first and second control signals for controlling the selective actuation of the work producing elements individually at high speed, said static electronic control comprising a plurality of electrically operable actuating devices there being one actuating device for each work producing element to be controlled, individual work producing element logic circuit means coupled to and controlling each of the respective actuating devices, means for coupling the first control signals from the code reader means to the input of the first work producing element logic circuit means for controlling operation of the first actuating device, means for coupling the respective timed second control signals from the scanning means to their respective associated individual work producing element logic circuit means, means for coupling code reader information bearing enabling signals between each logic circuit means and the logic circuit means of the next successive work producing element to thereby condition all of the logic circuit means in succession with the control information contained in the first control signals derived by the code reader means, means for coupling object location enabling signals produced by said scanning means between the logic circuit means of adjacent work producing elements for controlling each successive work producing element in accordance with the position of the objects being transported through the high speed sequentially actuated device, and reset logic circuit means coupled to all of the logic circuit means for resetting all of the work producing elements to a known condition at the start of an operation.

12. A static electronic control according to claim 1 further including manually operable relay means having contacts connected to all of the logic circuit means for actuating all of the electrically operable actuating devices simultaneously.

13. A static electronic control according to claim 11 wherein each of said logic circuit means comprises a memory logic means for producing an output ON signal at a first output terminal and an OFF signal at a second output terminal in response to a pulsed ON signal applied to a first input terminal and for retaining the ON signal at the first output terminal until an ON input signal is applied to a second input terminal whereupon the memory logic means switches to produce an OFF signal at its first output terminal and an ON signal at its second output terminal, a sealed AND logic means having a plurality of input terminals and an output terminal with feedback connections to seal in an output condition until the sealed AND logic means is switched by the presence or absence of an input signal at one of the input terminals, the output from the first output terminal of the memory logic means being applied to one input terminal of the sealed AND logic means and the output from the sealed AND logic means being connected to operate the electrically operable actuating device for the work producing element, the object location enabling signal from the next adjacent logic circuit means being supplied to the remaining input terminal of the sealed AND logic means, and the reset signal from the reset logic circuit means being applied to reset input terminals on both the memory logic means and the sealed AND logic means.

14. A static electronic control according to claim 13 wherein the second output terminal of the memory logic means of each logic circuit means is connected to the second input terminal of the memory logic means of the next successive diverter pin logic circuit means and serves to supply all of the diverter pin logic circuit means in succession with the control information contained in the input control signals supplied by the code reader to the input terminals of the memory logic means in the first logic circuit means.

15. A static electronic control according to claim 14 wherein the electrically operable diverter pin actuating devices comprise the solenoid actuating windings of an electro-mechanical coupling assembly for controlling the operation of the work producing elements, and further including manually operable relay means for actuating all of the solenoid actuating windings simultaneously.

16. A static electronic control according to claim 15 further including an output power amplifier connected to the output of each logic circuit means and having the output power terminals connected to excite the respective solenoid actuating winding of a work producing element and having a signal level input terminal connected to and controlled by the output from the sealed AND logic means of the respective logic circuit means.

References Cited

UNITED STATES PATENTS

| | | | |
|---|---|---|---|
| 3,144,926 | 8/1964 | Edelman | 209—111.7 X |
| 3,152,256 | 10/1964 | Zuck et al. | 209—111.7 X |
| 3,409,129 | 11/1968 | Sperry | 209—111.8 |
| 3,411,625 | 11/1968 | Calhoun | 209—111.7 |
| 3,414,731 | 12/1968 | Sperry | 209—111.7 X |

ALLEN N. KNOWLES, Primary Examiner

U.S. Cl. X.R.

209—111.7